Patented Oct. 20, 1931

1,828,262

UNITED STATES PATENT OFFICE

WILLIAM WYNDHAM TATUM, OF MANCHESTER, ENGLAND, ASSIGNOR TO BRITISH DYESTUFFS CORPORATION LIMITED, OF MANCHESTER, ENGLAND

PROCESS FOR THE MANUFACTURE AND PRODUCTION OF ANTHRAQUINONE INTERMEDIATES

No Drawing. Application filed February 10, 1926, Serial No. 87,447, and in Great Britain January 11, 1926.

It is already known (British patent 15,355 of 1908) that the leuco derivatives of quinizarine, 1:4-amino-hydroxy-anthraquinone and similar compounds, can be amidated by means of alcoholic solutions of ammonia or methylamine and that the leuco sulphonic acids of the above starting-out materials can be amidated by means of aqueous solutions of ammonia or methylamine. I have now discovered that it is not necessary to carry out a preliminary reduction of the quinizarine or amino-hydroxy-anthraquinones to leuco derivatives but that these compounds may be amidated and reduced simultaneously. The present invention is directed to a process which may be described generically as the manufacture of leuco amino anthraquinones of the general type

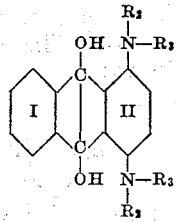

by the process which comprises simultaneously reacting upon an anthraquinone compound having the general formula

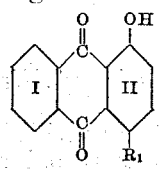

with a compound having the formula

and an alkaline metal hydrosulphite whereby the said anthraquinone compound is simultaneously amidated and reduced to the said leuco amino anthraquinone, and in which the benzene nucleus I may be further substituted and wherein $R_1$ represents $NH_2$ or OH and $R_2$ and $R_3$ represent hydrogen or an alkyl group. I find that when the substituent groups on the benzene nucleus I are $NH_2$ or OH groups or both the process is very satisfactory. The term "amidated" as used above is a broad term and is used to signify the introduction of the radicle

wherein $R_2$ and $R_3$ are the same as above indicated.

My process may also be described generically as the manufacture of leuco amino anthraquinones of the general type

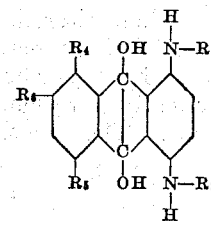

by a process which comprises simultaneously reacting upon an anthraquinone compound having the general formula

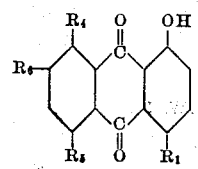

with the compound having the formula

and an alkaline metal hydrosulphite, whereby the said anthraquinone compound is simultaneously amidated and reduced to said leuco amino anthraquinone and wherein $R_1$ represents $NH_2$ or OH, $R_3$ represents hydrogen or an alkyl group, $R_4$ and $R_5$ represent hydrogen, $NH_2$ or OH and $R_6$ represents hydrogen or an OH group, not more than one NH₂ group or more than two OH groups or more than one NH₂ and one OH group being present at the same time in the nucleus I. The new process conveniently shortens the synthesis of useful dyestuff intermediates and consists essentially in warming quinizarine, or 1-amino-4-hydroxy-anthraquinone or derivatives of the same with aqueous solutions of ammonia or primary or secondary aliphatic amines in the presence of a suitable reducing agent such as an alkaline metal hydrosulphite. Sodium hydrosulphite is advantageous. The process is illustrated by the following examples.

(1) *Preparation of leuco 1:4-diamino-anthraquinone directly from quinizarine*

An autoclave is charged with 100 parts of quinizarine, 108 parts of sodium hydrosulphite (85 per cent), and 450 parts of aqueous ammonia (specific gravity from .92 to .88) and the whole warmed at a temperature of from 70° C. to 90° C. for six hours. The charge is then cooled, filtered, and washed with warm water. The product, which is obtained in the form of green or brown crystals, consists of practically pure leuco 1:4-diamino-anthraquinone. The reaction probably occurs as follows:

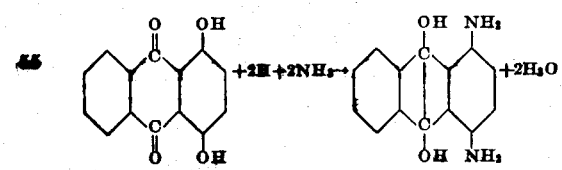

(2) *Direct conversion of 1:4-amino-hydroxy-anthraquinone to leuco di-(methyl amino)-anthraquinone*

100 parts of amino-hydroxy-anthraquinone and 105 parts of sodium hydrosulphite (85 per cent) are stirred with 800 parts of aqueous methylamine solution (30 per cent) at a temperature of from 30° to 80° C. At the conclusion of the reaction, the crystals of pure leuco di-(methyl amino)-anthraquinone are filtered off and washed with warm water. The reaction probably occurs as follows:

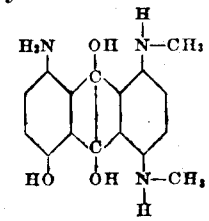

(3) *Methylamidation of diamino-anthrarufin or diamino-chrysazin*

100 parts of diamino-anthrarufin (or diamino chrysazin) are warmed at 80° C. with 1000 parts of aqueous methylamine solution (27 per cent), and 100 parts of sodium hydrosulphite (85 per cent) in a stirring autoclave. The charge is then cooled, filtered, and washed with warm water. The new leuco compound, whose constitution may in all probability be represented by the formula

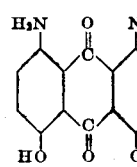

is obtained in high yield, and may be readily oxidized (for example by heating its solution in nitrobenzene) to a valuable new dyestuff which dyes acetate silk in beautiful greenish blue shades. The reaction probably occurs as follows:

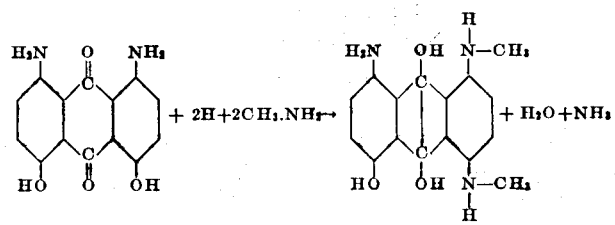

(4) *Methylamidation of Alizarine Bordeaux*

100 parts of finely divided Alizarine Bordeaux and 100 parts of sodium hydrosulphite (86 per cent) are stirred for 7 hours at 80° C. with 800 parts of aqueous methylamine solution in an autoclave. After cooling, the leuco dihydroxy-1:4-di-(methyl amino)-anthraquinone is filtered off, washed and dried. On oxidation (by means of ammonium persulphate for example) the leuco compound is converted into dihydroxy-1:4-di-(methyl amino)-anthraquinone, which dyes acetate silk a very greenish shade of blue. The reaction probably occurs as follows:

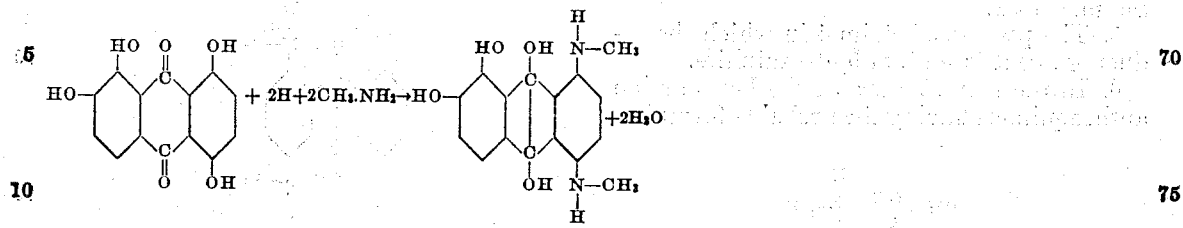

I claim:—

1. In the manufacture of leuco amino anthraquinone of the general type

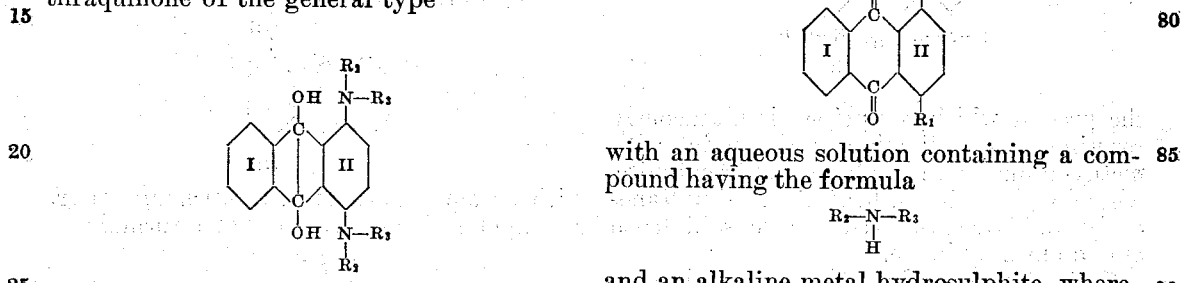

the process which comprises simultaneously reacting upon an anthraquinone compound having the general formula

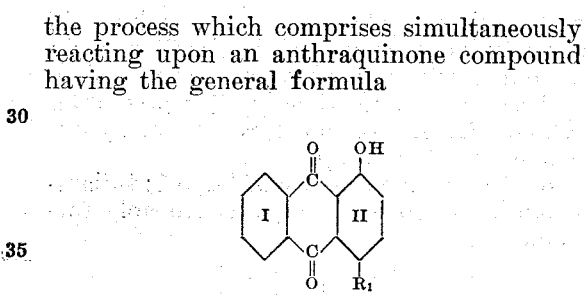

with a compound having the formula $$R_2\text{—}N\text{—}R_3$$
$$|$$
$$H$$

and an alkaline metal hydrosulphite whereby the said anthraquinone compound is simultaneously amidated and reduced to said leuco amino anthraquinone, and in which the benzene nucleus I may be further substituted and wherein $R_1$ represents $NH_2$ or OH groups and $R_2$ and $R_3$ represent hydrogen or an alkyl group.

2. The process of claim 1 in which the reducing agent is sodium hydrosulphite.

3. In the manufacture of leuco amino anthraquinones of the general type

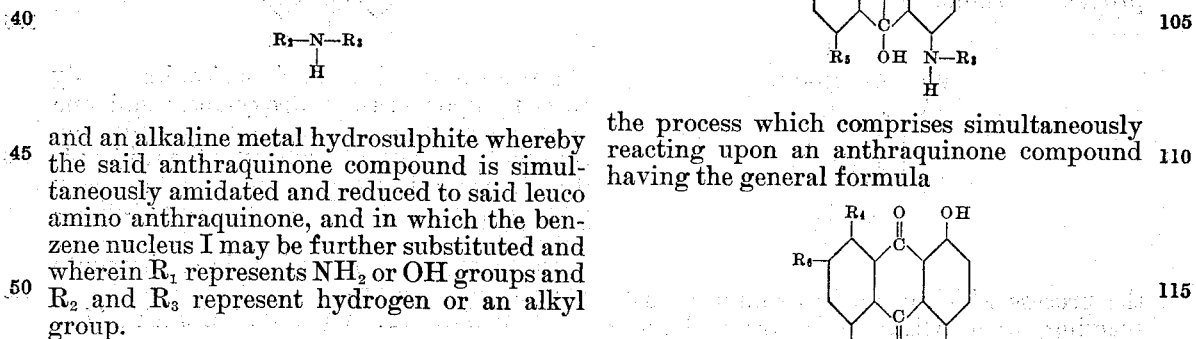

the process which comprises simultaneously reacting upon an anthraquinone compound having the general formula

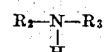

with an aqueous solution containing a compound having the formula $$R_2\text{—}N\text{—}R_3$$
$$|$$
$$H$$

and an alkaline metal hydrosulphite, whereby the said anthraquinone compound is simultaneously amidated and reduced to said leuco amino anthraquinone, and in which the benzene nucleus I may be further substituted and wherein $R_1$ represents $NH_2$ or OH groups and $R_2$ and $R_3$ represent hydrogen or a methyl group.

4. In the manufacture of leuco amino anthraquinones of the general type

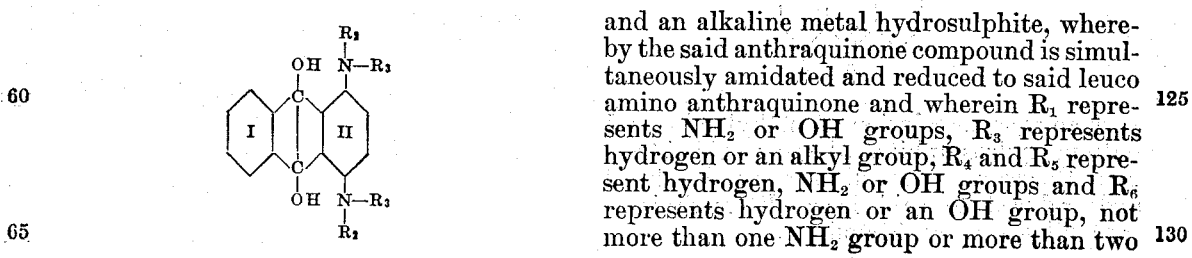

the process which comprises simultaneously reacting upon an anthraquinone compound having the general formula

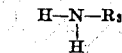

with a compound having the formula $$H\text{—}N\text{—}R_3$$
$$|$$
$$H$$

and an alkaline metal hydrosulphite, whereby the said anthraquinone compound is simultaneously amidated and reduced to said leuco amino anthraquinone and wherein $R_1$ represents $NH_2$ or OH groups, $R_3$ represents hydrogen or an alkyl group, $R_4$ and $R_5$ represent hydrogen, $NH_2$ or OH groups and $R_6$ represents hydrogen or an OH group, not more than one $NH_2$ group or more than two OH groups or more than one NH₂ and one OH groups being present at the same time in the nucleus I.

5. The process of claim 4 in which the reducing agent is sodium hydrosulphite.

6. In the manufacture of the leuco amino anthraquinone having the probable formula

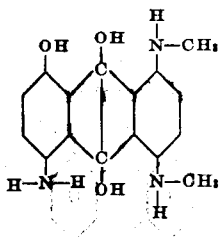

the process which comprises simultaneously reacting upon diamino anthrarufin with methylamine and sodium hydrosulphite, whereby the said anthrarufin is simultaneously amidated and reduced to said leuco amino anthraquinone.

7. As a new product, the leuco amino anthraquinone having the formula

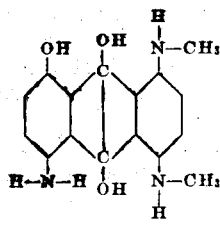

8. In the manufacture of leuco di-(methylamino)-dihydroxy-anthraquinone having the probable formula

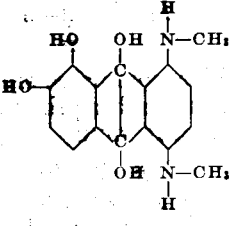

the process which comprises simultaneously reacting upon Alizarine Bordeaux having the probable formula

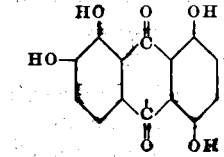

with an aqueous solution of methylamine and sodium hydrosulphite, whereby said Alizarine Bordeaux is simultaneously amidated and reduced to said leuco di-(methylamino)-dihydroxy-anthraquinone.

9. In the manufacture of leuco aminoanthraquinones of the general type

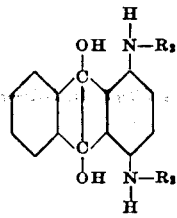

the process which comprises simultaneously reacting upon an anthraquinone compound having the general formula

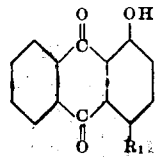

with an aqueous solution comprising water, a compound having the probable formula

and sodium hydrosulphite, whereby said anthraquinone compound is simultaneously amidated and reduced to said leuco aminoanthraquinone and wherein $R_1$ represents a $NH_2$ or $OH$ group, and $R_2$ represents hydrogen or a methyl group.

10. In the manufacture of leuco 1:4-diaminoanthraquinone having the probable formula

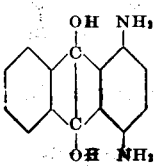

the process which comprises simultaneously reacting upon 1:4-dihydroxy-anthraquinone with an aqueous solution of ammonia and sodium hydrosulphite, whereby the said 1:4-dihydroxy-anthraquinone is simultaneously amidated and reduced to said leuco 1:4-diaminoanthraquinone.

In testimony whereof I have hereunto affixed my signature.

WILLIAM WYNDHAM TATUM.